(12) United States Patent
Kojima et al.

(10) Patent No.: US 8,377,534 B2
(45) Date of Patent: Feb. 19, 2013

(54) LIGHT-BLOCKING DECORATIVE SHEET

(75) Inventors: Kazuhito Kojima, Itabashi-ku (JP); Yoshiyuki Sugimoto, Kanagawa (JP); Tetsuya Miwa, Itabashi-ku (JP)

(73) Assignee: Lintec Corporation, Tokyo (JP)

( * ) Notice: Subject to any disclaimer, the term of this patent is extended or adjusted under 35 U.S.C. 154(b) by 312 days.

(21) Appl. No.: 12/669,348

(22) PCT Filed: Jul. 22, 2008

(86) PCT No.: PCT/JP2008/063101
§ 371 (c)(1),
(2), (4) Date: May 14, 2010

(87) PCT Pub. No.: WO2009/011446
PCT Pub. Date: Jan. 22, 2009

(65) Prior Publication Data
US 2010/0221476 A1 Sep. 2, 2010

(30) Foreign Application Priority Data
Jul. 19, 2007 (JP) .................. 2007-188046

(51) Int. Cl.
*B32B 9/00* (2006.01)
*B32B 33/00* (2006.01)
*B32B 7/12* (2006.01)

(52) U.S. Cl. .................. 428/40.1; 428/41.7; 428/42.1; 428/343; 428/354

(58) Field of Classification Search ................ 428/40.1, 428/41.7, 42.1, 343, 354, 195.1, 913.3; 283/56, 283/72, 117
See application file for complete search history.

(56) References Cited

U.S. PATENT DOCUMENTS

| | | | |
|---|---|---|---|
| 5,217,791 A | 6/1993 | Fujita et al. | |
| 5,364,704 A | 11/1994 | Murschall et al. | |
| 5,683,805 A * | 11/1997 | Oita et al. | 428/343 |
| 6,753,056 B1 | 6/2004 | Mizumoto | |
| 2007/0116949 A1 | 5/2007 | Hayashi et al. | |

FOREIGN PATENT DOCUMENTS

| | | |
|---|---|---|
| EP | 1 203 657 A1 | 5/2002 |
| JP | 2000 256041 | 9/2000 |
| JP | 2001 260302 | 9/2001 |
| JP | 2002 002192 | 1/2002 |
| JP | 2004 082373 | 3/2004 |
| JP | 2004 237738 | 8/2004 |
| JP | 2005 22096 | 1/2005 |
| JP | 2005 178062 | 7/2005 |
| JP | 2006 231880 | 9/2006 |

OTHER PUBLICATIONS

Extended European Search Report issued Jan. 5, 2012, in European Patent Application No. 08791382.8.

* cited by examiner

*Primary Examiner* — Patricia Nordmeyer
(74) *Attorney, Agent, or Firm* — Oblon, Spivak, McClelland, Maier & Neustadt, L.L.P.

(57) ABSTRACT

A shading decorative sheet which is excellent in a design and used for plate glasses of buildings, partitions for dividing a room and the like is provided by the present invention, and it comprises a base layer comprising a thermoplastic resin film having a haze value of 20% or more measured through a transmitted light according to JIS K7105 and formed on one surface of the base layer, a design layer comprising a decorative part having a similar color to that of the base layer and a non-decorative part.

17 Claims, No Drawings

LIGHT-BLOCKING DECORATIVE SHEET

TECHNICAL FIELD

The present invention relates to a shading decorative sheet. More specifically, it relates to a shading decorative sheet comprising an opaque base layer comprising a thermoplastic resin film and formed thereon a design layer having a similar color to that of the base layer. The shading decorative sheet of the present invention has an excellent masking effect and is excellent in a design, and it can be used as a shading decorative sheet for plate glasses of buildings, partitions for dividing a room and the like.

BACKGROUND ART

Heretofore, in transparent plate glasses and transparent partitions in a room, decorative sheets on which characters and patterns are printed and decorative sheets subjected to mat processing have so far been stuck on a part which is intended to be masked in order to intercept sight lines. However, when the above decorative sheets are stuck on transparent plate glasses and partitions, a boundary part between a part on which the sheet is stuck and a part on which the sheet is not stuck is visually emphasized, and therefore problems are involved therein in terms of a design.

Accordingly, a decorative film has come to be stuck on almost whole area of a plate glass and the like so that a boundary part is not produced.

Proposed as the above decorative sheets or films are a shading decorative sheet (patent document 1) which comprises a decorative layer and a base layer and in which an area ratio of an opaque area to a transparent area in the decorative layer is varied and a film for decoration (patent document 2) provided with patterns having gradation which is increased or decreased gradually in a longitudinal direction on the film.

In the above descriptions, a transparent part is present in the decorative film having a gradation area, and a sight line has not been able to be intercepted in the above part. That is, some distance has to be kept in order to exert a masking effect, and the problem that seeing through is possible through the transparent part when coming close to the film has been involved therein.

In addition to the film for decoration disclosed in the patent document described above, simple sheets prepared by using a uniform white film have so far been used as a shading decorative sheet having a masking effect, but sheets prepared by using a white film on which white patterns having a specific design are printed have not ever been available.

In all of the sheets described above, the following concept in the present invention is not applied.

A concept of unison is applied to the shading decorative sheet of the present invention, and it is excellent in design and can provide transparent glass and the like with an excellent masking effect.

Patent document 1: JP 2005-22096 A
Patent document 2: JP 2006-231880 A

DISCLOSURE OF THE INVENTION

Problems to be Solved by the Invention

An object of the present invention is to provide a shading decorative sheet which can provide transparent glass and the like with an excellent masking effect and which is excellent in design.

Means for Solving the Problems

Various researches repeated by the present inventors have resulted in finding that the object described above can be achieved by applying a concept of unison, and thus the present invention has been completed.

That is, provided by the present invention are:

(1) a shading decorative sheet comprising a base layer comprising a thermoplastic resin film having a haze value of 20% or more measured according to JIS K7105 and formed on one surface of the base layer, a design layer comprising a decorative part having a similar color to that of the base layer and a non-decorative part, (2) the shading decorative sheet according to the above item (1), wherein both of the colors of the decorative part and the thermoplastic resin film having a haze value of 20% or more are white, (3) the shading decorative sheet according to the above item (1), wherein the design layer is formed by an electrophotographic printing method, an ink jet printing method or a thermal transfer printing method, (4) the shading decorative sheet according to the above item (1), wherein a substantially transparent protective layer is provided on a surface of the design layer at an opposite side of the base layer, (5) the shading decorative sheet according to the above item (4), wherein a pressure sensitive adhesive layer is provided between the design layer and the base layer, (6) the shading decorative sheet according to the above item (5), wherein a pressure sensitive adhesive layer is provided on a surface of the protective layer at an opposite side of the design layer, (7) the shading decorative sheet according to the above item (6), wherein a release sheet is provided on a surface of the pressure sensitive adhesive layer at an opposite side of the protective layer, (8) the shading decorative sheet according to the above item (1), wherein a pressure sensitive adhesive layer is provided on a surface of the base layer at an opposite side of the design layer, (9) the shading decorative sheet according to the above item (8), wherein a release sheet is provided on a surface of the pressure sensitive adhesive layer at an opposite side of the base layer,

(10) the shading decorative sheet according to the above item (4), wherein a pressure sensitive adhesive layer is provided between the design layer and the protective layer,

(11) the shading decorative sheet according to the above item (10), wherein a pressure sensitive adhesive layer is provided on a surface of the base layer at an opposite side of the design layer,

(12) the shading decorative sheet according to the above item (11), wherein a release sheet is provided on a surface of the pressure sensitive adhesive layer at an opposite side of the base layer,

(13) the shading decorative sheet according to the above item (10), wherein a pressure sensitive adhesive layer is provided on a surface of the protective layer at an opposite side of the design layer and

(14) the shading decorative sheet according to the above item (13), wherein a release sheet is provided on a surface of the pressure sensitive adhesive layer at an opposite side of the protective layer.

Effect by the Invention

According to the present invention, capable of being provided is a shading decorative sheet which is excellent in design and which has an excellent masking effect to transparent glass and the like.

BEST MODE FOR CARRYING OUT THE INVENTION

The shading decorative sheet of the present invention is explained below in details.

The shading decorative sheet of the present invention comprises a base layer and a design layer, and the above base layer comprises a thermoplastic resin film having a haze value of 20% or more measured according to JIS K7105. The above design layer is formed on one surface of the base layer and comprises a decorative part having a similar color to that of the base layer and a non-decorative part. The non-decorative part in the design layer is an exposed part of the above base layer comprising the thermoplastic resin film, and a combination of the decorative part and the non-decorative part is referred to as the design layer in the present invention.

In respect to whether or not "the decorative part and the non-decorative part have similar colors" referred to in the present invention, a method for distinguishing it is varied depending on whether the shading decorative sheet has a chromatic color or an achromatic color.

Accordingly, whether the shading decorative sheet has a chromatic color or an achromatic color has to be first distinguished.

A chromatic color is distinguished from an achromatic color in the following manner.

In a L*a*b* color system described in JIS Z8729, a color in which an amount of "ab" chroma $c^* = \sqrt{(a^{*2} + b^{*2})}$ corresponding to a chromaticness is larger than 12 is classified to a chromatic color, and a color in which it is 12 or less is classified to an achromatic color.

Subsequently, the definition of whether they are similar colors in a case of a chromatic color and a case of an achromatic color is described.

(1) Case of a Chromatic Color:

In the L*a*b* color system described in JIS Z8729, when a difference between "ab" hue angles "h"=tan$^{-1}$ (b*/a*) of two colors is 30 degrees or less, the two colors are assumed to be similar colors. When the difference exceeds 30 degrees, they are assumed to be no similar colors.

(2) Case of an Achromatic Color:

An achromatic color includes white, grey and black colors depending on a brightness; colors having a brightness close to 0 look black; colors having a brightness of larger than 40 look white; colors having a brightness present in a middle of them look grey. They are classified only by a difference in brightness, and when both of two colors are achromatic colors, they are assumed to be similar colors.

Further, in the design layer in the shading decorative sheet of the present invention, the non-decorative part means principally a part in which a decorative part is not involved at all (for example, when the decorative part is formed by a printing system, a printed part is not involved at all therein), but it means as well a decorative part which is provided with pale decoration.

Any of films which have so far been used can be used for the thermoplastic resin film constituting the base film described above.

Capable of being used are, for example, films which are optionally selected from films of cellulose triacetate, cellulose diacetate, cellophane, oriented polypropylene, cast polypropylene, polyethylene, polystyrene, polyurethane, polycarbonate, polyvinyl alcohol, polyvinyl chloride, polymethyl methacrylate, polyethylene terephthalate and the like, and which are endowed with various performances.

Among the above films, films comprising polyvinyl chloride and polyethylene terephthalate are preferably used since haze values thereof can be readily controlled.

A thickness of the above films falls in a range of usually 5 to 200 µm, preferably 10 to 100 µm and more preferably 20 to 50 µm.

Controlling the thickness to 200 µm or less secures a flexibility of the film and prevents a workability of the shading decorative sheet from being deteriorated. Controlling it to 5 µm or more secures a mechanical strength of the shading decorative sheet and makes handling thereof easy. This thermoplastic resin film may be either colorless or colored.

An ultraviolet ray absorber, a light stabilizer, an antioxidant and the like can be added to the thermoplastic resin film constituting the base film described above. Organic substances of a benzotriazole base, a benzophenone base, a salicylate base, cyanoacrylate base and the like can be used as the ultraviolet ray absorber. Hindered amine compounds and the like can be used as the light stabilizer. Hindered phenol compounds, phosphorus compounds, sulfur compounds and the like can be used as the antioxidant.

The base layer comprising the thermoplastic resin film in the present invention has a haze value of 20% or more measured according to JIS K7105 (hereinafter, occasionally referred to merely as the haze value), and it is preferably 40% or more, more preferably 70% or more. Controlling the haze value to 20% or more makes it possible to secure the making effect.

Controlling the haze value in the base layer to 20% or more can be achieved by mixing a pigment with a transparent thermoplastic resin and forming a film from the mixture or mixing the above pigment with a resin which is a binder and coating the mixture on a surface of a transparent thermoplastic resin film or mixing a foaming agent with a transparent thermoplastic resin and foaming it or subjecting a surface of a transparent thermoplastic resin film to mechanical roughening processing.

The pigment which can be used in order to control the haze value in the base layer to 20% or more includes pigments comprising inorganic materials such as titanium oxide, calcium carbonate, barium sulfate, talc, silica, alumina, zirconia, tin oxide, zinc oxide, kaolin and the like and organic materials such as fine particles of resins including polyethylene, acryl and the like (different materials from a thermoplastic resin which is a material for the film constituting the base layer, that is, they have to have a different refractive index).

Among them, titanium oxide, barium sulfate and silica are preferred, and titanium oxide is particularly preferred since it has a high refractive index and scatters light well.

When the pigment is used from the viewpoint of a uniformity of the base layer, that is, the viewpoint that the base layer shows a uniform haze value and a uniform whole light transmission ratio, a particle diameter and a standard deviation of the pigment are preferably controlled. An average particle diameter of the pigment used which is determined by a dynamic scattering method is preferably 0.1 to 3.0 µm, and a standard deviation of the average particle diameter is preferably 1.90 µm or less. Further, the average particle diameter is particularly preferably 0.1 to 3.0 µm, and a standard deviation of the average particle diameter is particularly preferably 1.70 µm or less.

In order to control a haze value of the base layer to 20% or more by mixing a pigment comprising an inorganic or organic material, a content of the pigment mixed in addition to a particle diameter thereof has to be controlled.

For example, when using a transparent film having a thickness of about 50 μm which is frequently used in a shading decorative sheet and using titanium oxide having a particle diameter of 0.1 to 3.0 μm which is most usually used as a white pigment, the content thereof is 5 to 35% by mass.

A method for subjecting a surface of the transparent thermoplastic resin film to mechanical roughening processing to thereby control a haze value thereof to 20% or more is not specifically restricted, and publicly known methods can be employed. Specifically, it includes various roughening processing methods such as a sand blast method, an emboss method and the like. The emboss method is a method for roughening processing by pressing a roll on which fine unevenness is formed regularly or irregularly on a surface.

A total luminous transmittance of the thermoplastic resin film is 30% or more, preferably 40 to 90%.

Controlling a whole light transmission ratio of the thermoplastic resin film to 30% or more makes it possible to secure a brightness of a part in which the decorative part is not formed or a part in which the decorative part is lightly formed (for example, a part which is not printed or a part which is lightly printed).

When subjecting the resin film to mechanical roughening processing to prepare the base layer, both surfaces of the transparent thermoplastic resin film may be subjected thereto or only one surface thereof may be subjected thereto.

The base film comprising the thermoplastic resin film having a haze value of 20% or more in the shading decorative sheet of the present invention may be a laminate of a thermoplastic resin film having a haze value of 20% or more and a transparent film having a haze value of almost zero.

Subsequently, the design layer is explained.

The design layer comprises a decorative part and a non-decorative part, and it is formed usually on one surface of the base layer described hereinabove by a printing method. When forming the design layer on the base layer, the design layer may be formed on one surface of "a substantially transparent protective layer" described later to laminate the design layer on one surface of the base layer through the pressure sensitive adhesive layer.

The design layer is formed by an electrophotographic printing method, a thermal transfer printing method, an ink jet printing method, a screen printing method, an offset printing method, a gravure printing method, a flexographic printing method and the like. The ink jet printing method includes an ultraviolet ray curing system, an aqueous thermal curing system, a vegetable oil system, a solvent system and the like. The design layer having a high resolution and a high fineness is obtained by the ink jet printing method, and the ultraviolet ray curing system and the aqueous thermal curing system make it possible to print as well on the base layer having a poor ink accepting property. The thermal transfer printing method makes it possible to print at a high speed. Among the above printing methods, the electrophotographic printing method, the thermal transfer printing method and the ink jet printing method are preferably used in terms of making on-demand printing possible. Further, printing may be carried out once or many times.

An area occupied by the decorative part in the design layer formed on one surface of the base layer accounts for usually 5 to 95% based on the whole surface of the base layer from the viewpoint of a good balance between the masking effect and the design, and the decorative part may be various pictures, mosaic patterns or geometric patterns or may be characters or combinations thereof. Further, various patterns and characters may be shaded. When the patterns and the characters are shaded, a combined whole light transmission ratio of the base layer and the decorative part comes to have a gradient depending on a plane position of the decorative part.

In the shading decorative sheet of the present invention, a color thereof is not restricted to a white color as long as the base layer and the decorative part have similar colors, and it is preferably a white color in terms of a large difference in brightness between colors observed through a reflected light, and a transmitted light and an excellent design.

As described above, the base layer in the shading decorative sheet of the present invention has indispensably a haze value of 20% or more, preferably 40% or more, and more preferably 70% or more.

Subsequently, there is described a substantially transparent protective layer provided on a surface of the design layer at an opposite side of the base layer. The above protective layer has a role to prevent the design layer formed on the base layer from being peeled off or contaminated, and a substantially transparent material is preferably used so that an influence is not exerted on the masking effect and the design.

The term "substantially transparent" means that the protective layer has a haze value of 20% or less, preferably 10% or less and more preferably 5% or less. A design of the shading decorative sheet of the present invention is maintained by controlling a haze value of the protective layer to 20% or less. The film constituting the base layer described above may be used as it is as the protective layer without subjecting it to haze processing or a film which is processed so that a haze value thereof is reduced may be used. A thickness of the protective layer may stay in the same level as that of the base layer described hereinabove.

Also, when providing the protective layer, the design layer and the protective layer may be laminated to each other by a heat seal method without using a pressure sensitive adhesive.

Further, when providing the protective layer in the shading decorative sheet of the present invention, the decorative sheet can be produced as well in an order of providing first the design layer on the protective layer and then laminating it on the base layer through a pressure sensitive adhesive layer. The pressure sensitive adhesive layer can be provided according to a case in which the design layer is provided on the base layer.

Subsequently, the pressure sensitive adhesive layer is described.

In the present invention, the pressure sensitive adhesive layer is provided, optionally, (a) between the base layer and the design layer, (b) on a surface of the base layer at an opposite side of the design layer, (c) between the design layer and the protective layer described hereinabove and (d) on a surface of the protective layer at an opposite side of the design layer described hereinabove.

The pressure sensitive adhesive layer in the (a) has a role to enhance an adhesion between the base layer and the design layer. The pressure sensitive adhesive layer in the (b) has a role to stick the shading decorative sheet of the present invention on an article to be adhered such as glass and the like. The pressure sensitive adhesive layer in the (c) has a role to enhance an adhesion between the design layer and the protective layer described hereinabove. The pressure sensitive adhesive layer in the (d) has a role to stick the shading decorative sheet of the present invention on an article to be adhered such as glass and the like.

The kind and the material of the pressure sensitive adhesive are not specifically restricted in all the above cases.

The examples of the pressure sensitive adhesive which is usable include silicone-based pressure sensitive adhesives, acrylic pressure sensitive adhesives, rubber-based pressure sensitive adhesives, urethane-based pressure sensitive adhesives, polyvinyl butyral-based pressure sensitive adhesives, ester-based pressure sensitive adhesives and the like. In particular, the acrylic pressure sensitive adhesives and the like having a weatherability are preferred.

The pressure sensitive adhesive layer can be blended, if necessary, with a weatherability enhancing agent such as an ultraviolet ray absorber to enhance a weatherability. The compounds shown as the examples in the descriptions for the base layer described above are used as the ultraviolet ray absorber. A blend amount of the ultraviolet ray absorber in the pressure sensitive adhesive layer is preferably 0.1 to 20% by mass, particularly preferably 10% by mass or less.

A thickness of the pressure sensitive adhesive layer formed is usually 1 to 50 μm, preferably 5 to 30 μm. Controlling a thickness of the pressure sensitive adhesive layer to 1 μm or more makes it possible to secure the adhesive force and the cohesive force (holding power) which are required. Further, controlling it to 50 μm or less makes it possible to prevent the cost from increasing and restrain the pressure sensitive adhesive layer from protruding from the edge part.

The pressure sensitive adhesive can be coated by a gravure coating method, a bar coating method, a roll coating method, a die coating method, a knife coating method, an air knife coating method, a hot melt coating method, a curtain coating method and the like which are usually carried out.

When the pressure sensitive adhesive is used in order to stick the decorative sheet on an article to be adhered, that is, when the pressure sensitive adhesive is applied on a surface of the base layer at an opposite side of the design layer [the case of the (b)] and a surface of the protective layer at an opposite side of the design layer described hereinabove [the case of the (d)], a release sheet such as a release paper, a release film and the like is preferably stuck in order to protect the pressure sensitive adhesive layer formed.

Used as the release sheet are sheets prepared by coating a release agent such as fluorine-based resins, silicone-based resins, long chain alkyl group-containing carbamate and the like on various thermoplastic resin films which constitute the base layer described hereinabove and high density base papers including glassine paper, clay coat paper, craft paper, laminated papers obtained by laminating polyethylene resins and the like on papers such as woodfree paper and the like.

A thickness of the release sheet is varied to some extent depending on a material used, and it is usually 10 to 250 μm, preferably 20 to 200 μm.

A release agent is coated so that a dry mass is 0.01 to 3 g/m² or so, and cured by heat or an ultraviolet ray to thereby form a release agent layer. A thickness of the release agent layer is not specifically restricted and falls usually in a range of 0.01 to 3 μm or so.

In order to prevent jamming from being caused by a static charge in printing, antistatic treatment is preferably carried out so that the surface resistivity is $10^{12}$ Q or less.

The laminate states of the respective layers in the respective inventions described hereinabove is collectively described below.

Invention (1): design layer/base layer
Invention (4): protective layer/design layer/base layer
Invention (5): protective layer/design layer/pressure sensitive adhesive layer/base layer
Invention (6): pressure sensitive adhesive layer/protective layer/design layer/pressure sensitive adhesive layer/base layer
Invention (7): release sheet/pressure sensitive adhesive layer/protective layer/design layer/pressure sensitive adhesive layer/base layer
Invention (8): design layer/base layer/pressure sensitive adhesive layer
Invention (9): design layer/base layer/pressure sensitive adhesive layer/release sheet
Invention (10): protective layer/pressure sensitive adhesive layer/design layer/base layer
Invention (11): protective layer/pressure sensitive adhesive layer/design layer/base layer/pressure sensitive adhesive layer
Invention (12): protective layer/pressure sensitive adhesive layer/design layer/base layer/pressure sensitive adhesive layer/release sheet
Invention (13): pressure sensitive adhesive layer/protective layer/pressure sensitive adhesive layer/design layer/base layer
Invention (14): release sheet/pressure sensitive adhesive layer/protective layer/pressure sensitive adhesive layer/design layer/base layer

EXAMPLE

Subsequently, the present invention is explained in further details with reference to Examples and Comparative Examples, but the present invention is not restricted by these Examples.

Example 1

A design layer (a decorative layer accounts for about 20% based on the whole area) having a white-colored decorative part provided with polka-dot patterns having a diameter of 10 mm and an interval of 10 mm was formed on a surface of a pressure sensitive adhesive sheet having an acrylic pressure sensitive adhesive layer on one surface of a substantially transparent protective layer (a polymethyl methacrylate film having a haze value of 1.0% measured according to JIS K7105) at an opposite side of the above acrylic pressure sensitive adhesive layer by means of an ultraviolet ray curing type ink jet printer (Winteria White Maker WM-110 UV, manufactured by LINTEC Corporation), and a white base layer having a haze value of 48.8% (a film in which a haze value was controlled by subjecting a surface of a film made of a fluororesin to an emboss treatment) was laminated on the above design layer through an acrylic pressure sensitive adhesive, whereby a shading decorative sheet was prepared.

Example 2

Prepared was a shading decorative sheet in which a design layer having a white decorative part comprising polka-dot patterns having a diameter of 10 mm and an interval of 10 mm was formed on a surface of a pressure sensitive adhesive sheet (Lumicool 1301, manufactured by LINTEC Corporation) having an acrylic pressure sensitive adhesive layer on one surface of a white-colored base layer having a haze value of 79.8% (a film in which a haze value was controlled by mixing a polyethylene terephthalate resin with a white pigment) at an opposite side of the above acrylic pressure sensitive adhesive layer by means of the ultraviolet ray curing type ink jet printer (Winteria White Maker WM-110 UV, manufactured by LINTEC Corporation).

Example 3

A shading decorative sheet having a design layer formed thereon was prepared in the same manner as in Example 2, except that there was used a pressure sensitive adhesive sheet (Mistlass MST5000, manufactured by LINTEC Corporation) having an acrylic pressure sensitive adhesive layer on one surface of a white-colored base layer having a haze value of 92.2% (a film in which a haze value was controlled by coating a resin mixed with a white-colored pigment on a polyethylene terephthalate film).

Example 4

A shading decorative sheet having a design layer formed thereon was prepared in the same manner as in Example 2, except that there was used a pressure sensitive adhesive sheet (TT Mount BL-1, manufactured by LINTEC Corporation) having an acrylic pressure sensitive adhesive layer on one surface of a white-colored base layer having a haze value of 93.2% (a film in which a haze value was controlled by mixing a polyvinyl chloride resin with a white pigment).

Example 5

A shading decorative sheet having a design layer formed thereon was prepared in the same manner as in Example 2, except that a decorative part of a cyan color (using an ink having a similar color to that of the base layer) having a form of polka-dotted patterns having a diameter of 10 mm and an interval of 10 mm was provided on a surface of a pressure sensitive adhesive sheet (Viewcal 92919, manufactured by LINTEC Corporation) having an acrylic pressure sensitive adhesive layer on one surface of a base layer of a cyan color having a haze value of 26.1% (a film in which a haze value was controlled by mixing a polyvinyl chloride resin with a pigment of a cyan color) at an opposite side of the above acrylic pressure sensitive adhesive layer by means of the ultraviolet ray curing type ink jet printer (Winteria White Maker WM-110 UV, manufactured by LINTEC Corporation).

Example 6

A shading decorative sheet having a design layer formed thereon was prepared in the same manner as in Example 2, except that a decorative part of a magenta color (using an ink having a similar color to that of the base layer) was provided on a surface of a pressure sensitive adhesive sheet (Viewcal 9234, manufactured by LINTEC Corporation) having an acrylic pressure sensitive adhesive layer on one surface of a base layer of a magenta color having a haze value of 46.6% (a film in which a haze value was controlled by mixing a polyvinyl chloride resin with a pigment of a magenta color) at an opposite side of the above acrylic pressure sensitive adhesive layer.

The shading decorative sheets obtained in Examples 1 to 4 are examples in which the white decorative part of an achromatic color was formed on the white base layer of an achromatic color.

Examples 5 and 6 are examples in which the white decorative part of a chromatic color was formed on the white base layer of a chromatic color.

In Examples 1 to 4, both of ab chroma c* of the decorative part and the non-decorative part are 12 or less when observed through a transmitted light, and the decorative part and the non-decorative part have similar colors (unison).

Also, when the decorative part is observed through a reflected light and a transmitted light, both of ab chroma c* thereof are 12 or less, and colors observed through a reflected light and a transmitted light are similar colors (unison).

In Examples 5 and 6, a difference in an "ab" hue angle "h" between the decorative part and the non-decorative part is 30 degrees or less when observed through a transmitted light, and the decorative part and the non-decorative part have similar colors (unison).

Also, when the decorative part is observed through a reflected light and a transmitted light in comparison, a difference in an "ab" hue angle "h" between colors observed through a reflected light and a transmitted light is 30 degrees or less, and the colors observed through a reflected light and a transmitted light are similar colors (unison).

In respect to a brightness L*, observed is the effect that the decorative part has a higher brightness than that of the non-decorative part in a case of a reflected light and that the decorative part has lower brightness than that of the non-decorative part in a case of a transmitted light.

In the shading decorative sheets obtained in Examples 1 to 6 described above, a total luminous transmittance of the base layer is set to 30% or more, and therefore the design layer can be recognized as well from a side of the base layer which is opposite to the design layer.

Further, in Examples 4 to 6, the decorative part and the non-decorative part have similar colors, and in addition thereto, a difference in brightness between them in a reflected light is controlled to 10 or less. Accordingly, when illumination in a room is dark, the decorative part can not be recognized through a reflected light, but the design that the decorative part can be recognized through a transmitted light by illuminating the back surface with a back light is exerted as well.

Comparative Example 1

Prepared was a shading decorative sheet for comparison in which a design layer having the same white decorative part as in Example 2 was formed on a surface of a pressure sensitive adhesive sheet (Lumicool 1501UH, manufactured by LINTEC Corporation) having an acrylic pressure sensitive adhesive layer on one surface of a colorless base layer (a substantially transparent film made of a polyethylene terephthalate resin) having a haze value of 2.0% measured according to JIS K7105 at an opposite side of the above acrylic pressure sensitive adhesive layer.

Comparative Example 2

A shading decorative sheet having a design layer formed thereon was prepared in the same manner as in Example 4, except that a decorative part of a magenta color (using an ink having a color which was not similar to that of the white base layer) was provided.

Comparative Example 3

A shading decorative sheet having a design layer formed thereon was prepared in the same manner as in Example 6, except that a decorative part of a cyan color (using an ink having a color which was not similar to that of the base layer of a magenta color) was provided.

In the shading decorative sheet for comparison obtained in Comparative Example 1, a haze value of the base layer is smaller than 20%, and therefore a masking effect is not obtained.

The shading decorative sheet for comparison obtained in Comparative Example 2 is an example in which the magenta decorative part of a chromatic color was formed on the white base layer of an achromatic color, and it is an example in which they do not have similar colors. When the decorative part is compared through a reflected light and a transmitted light, "ab" chroma c* thereof is as high as 55.2 in a case of a reflected light, and the decorative part shows a bright magenta color. In a case of a transmitted light, the ab chroma c* is reduced to 1.9, and a color thereof is turned into an achromatic color, so that the decorative part does not show similar colors (unison) in a reflected light and a transmitted light.

The shading decorative sheet for comparison obtained in Comparative Example 3 is an example in which the cyan decorative part of a chromatic color was formed on the magenta base layer of a chromatic color. A difference in an "ab" hue angle "h" between the decorative parts observed through a reflected light and a transmitted light is larger than 30 degrees, and the decorative part does not show similar colors (unison) in a reflected light and a transmitted light (the decorative part shows a cyan color in a reflected light, but it shows a strongly reddish color in a transmitted light due to an effect exerted by a magenta color of the base layer).

In the shading decorative sheets of the present invention obtained in Examples 1 to 6 and the shading decorative sheets for comparison obtained in Comparative Examples 1 to 3, the masking effects and the design properties were evaluated. The results thereof are shown in Table 1.

TABLE 1

| | Color of base layer | Color of decorative part | Measured place | Reflected light | | | | |
|---|---|---|---|---|---|---|---|---|
| | | | | Brightness L* | Color coordinate a* | Color coordinate b* | ab chroma c* | ab hue angle h (degree) |
| Example 1 | W | W | Non-decorative part | 48.4 | 0.1 | −1.4 | 1.4 | 273 |
| | | | Decorative part | 83.4 | −1.0 | −2.0 | 2.2 | 243 |
| Example 2 | W | W | Non-decorative part | 58.3 | 0.1 | −3.1 | 3.1 | 271 |
| | | | Decorative part | 83.5 | −1.4 | −1.2 | 1.8 | 222 |
| Example 3 | W | W | Non-decorative part | 75.4 | −0.4 | −1.1 | 1.2 | 253 |
| | | | Decorative part | 87.1 | −1.2 | 0.0 | 1.2 | 182 |
| Example 4 | W | W | Non-decorative part | 82.0 | −0.6 | −1.6 | 1.7 | 249 |
| | | | Decorative part | 87.2 | −1.3 | −0.4 | 1.3 | 195 |
| Example 5 | C | C | Non-decorative part | 30.5 | −2.9 | −17.6 | 17.8 | 261 |
| | | | Decorative part | 34.1 | −4.9 | −27.0 | 27.5 | 260 |
| Example 6 | M | M | Non-decorative part | 30.7 | 24.8 | −0.5 | 24.8 | 359 |
| | | | Decorative part | 32.7 | 34.4 | −0.7 | 34.4 | 358 |
| Comparative Example 1 | Colorless | W | Non-decorative part | 32.6 | 0.3 | −3.7 | 3.7 | 275 |
| | | | Decorative part | 81.2 | −1.1 | −3.2 | 3.4 | 251 |
| Comparative Example 2 | W | W | Non-decorative part | 82.0 | −0.6 | −1.6 | 1.7 | 249 |
| | | | Decorative part | 45.9 | 53.5 | −13.7 | 55.2 | 345 |
| Comparative Example 3 | M | C | Non-decorative part | 30.7 | 24.8 | −0.5 | 24.8 | 359 |
| | | | Decorative part | 32.2 | −1.3 | −17.2 | 17.3 | 266 |

| | Transmitted light | | | | | | | |
|---|---|---|---|---|---|---|---|---|
| | Brightness L* | Color coordinate a* | Color coordinate b* | "ab" chroma c* | "ab" hue angle "h" (degree) | Haze (%) | Total luminous transmittance (%) | Masking effect | Design |
| Example 1 | 76.9 | −0.2 | 4.3 | 4.3 | 92 | 48.8 | 88.7 | ○ | ○ |
| | 2.4 | 2.1 | 0.6 | 2.2 | 16 | 93.0 | 46.1 | | |
| Example 2 | 52.9 | 1.1 | 10.5 | 10.5 | 84 | 79.8 | 78.9 | ◎ | ○ |
| | 1.4 | 1.2 | 1.0 | 1.6 | 39 | 93.1 | 44.7 | | |
| Example 3 | 11.9 | 0.0 | 1.0 | 1.0 | 91 | 92.2 | 58.3 | ◎ | ○ |
| | 1.7 | 1.5 | −0.4 | 1.6 | 344 | 93.1 | 33.8 | | |
| Example 4 | 4.5 | 0.5 | −0.1 | 0.5 | 346 | 93.2 | 42.9 | ◎ | ◎ |
| | 0.9 | 1.1 | 0.7 | 1.3 | 33 | 93.2 | 33.1 | | |
| Example 5 | 66.1 | −33.6 | −34.2 | 47.9 | 225 | 26.1 | 37.4 | ○ | ◎ |
| | 39.7 | −30.6 | −29.2 | 42.2 | 224 | 68.7 | 26.6 | | |
| Example 6 | 49.1 | 53.8 | −18.3 | 56.8 | 341 | 46.6 | 32.0 | ○ | ◎ |
| | 23.4 | 49.0 | −8.9 | 49.8 | 350 | 73.3 | 22.2 | | |
| Comparative Example 1 | 96.4 | 0.0 | 1.3 | 1.3 | 341 | 2.0 | 93.1 | X | ○ |
| | 2.2 | −0.3 | 1.9 | 1.9 | 100 | 97.0 | 39.3 | | |
| Comparative Example 2 | 4.5 | 0.5 | −0.1 | 0.5 | 346 | 93.2 | 42.9 | ◎ | X |
| | 1.6 | −1.6 | 1.0 | 1.9 | 148 | 93.0 | 15.1 | | |
| Comparative Example 3 | 49.1 | 53.8 | −18.3 | 56.8 | 341 | 46.6 | 32.0 | ○ | X |
| | 20.6 | 24.1 | −29.0 | 37.7 | 310 | 75.3 | 47.8 | | |

In Table 1, "brightness L*", "color coordinate a*", "color coordinate b*", "ab chroma c*" and "ab hue angle h (degree)" are numerical values measured (measuring device: simultaneous photometric spectroscopic color meter SQ 2000, manufactured by Nippon Denshoku Industries Co., Ltd.) based on JIS Z8729 (Color specification), and a black-colored press plate was used in measurement by reflection assuming that the background becomes black at night.

The "brightness L*" represents the degree of the brightness and shows that the larger the numerical value is, the brighter the color is and that the smaller the numerical value is, the darker the color is.

The "color coordinate a*" shows a reddish color when a numerical value thereof is plus and a greenish color when a numerical value thereof is minus.

The "color coordinate b*" shows a yellowish color when a numerical value thereof is plus and a bluish color when a numerical value thereof is minus.

The "ab chroma c*" shows a distance from an origin, that is, a chromaticness in a specific color represented by two color coordinates (a*, b*) which are orthogonal, and it is a chromatic color when a value thereof is large and an achromatic color which does not contain a reddish color, a greenish color, a yellowish color and a bluish color when it is small.

The "ab hue angle h" shows an angle which is counter-clockwise from the color coordinate a* in a specific color represented by two color coordinates (a*, b*) which are orthogonal, and it is calculated according to $\tan^{-1}(b*/a*)$. When the value is 0 degree, it shows a red color; when it is 90 degrees, it shows a yellow color; when it is 180 degrees, it shows a green color; and when it is 270 degrees, it shows a blue color.

In a case of an achromatic color, the ab hue angle h is scattered to a large extent due to a measurement error of a* and b* since the values of a* and b* are small, and therefore it is not applied to an achromatic color.

The "haze (%)" and the "total luminous transmittance (%)" are numerical values measured (by means of a turbidity meter NDH 2000, manufactured by Nippon Denshoku Industries Co., Ltd.) based on JIS K7105 (Testing method for optical properties of plastics).

In Table 1, W, C and M represent respectively a white color, a cyan color (bluish green) and a magenta color (reddish purple).

<Masking Effect>

The masking effect of the shading decorative sheet was judged according to the following criteria.

It was marked with ⊚ (excellent masking effect observed) in a case where an outline of a person present in a place apart by 1 m therefrom could not be distinguished through the shading decorative sheet; it was marked with ○ (masking effect observed) in a case where it could be barely distinguished; and it was marked with × (no masking effect observed) in a case where it could be clearly distinguished.

<Design>

The design of the shading decorative sheet was judged according to the following criteria.

It was marked with ○ in a case where the decorative part showed similar colors (unison) through a reflected light and a transmitted light; it was marked with ⊚ in a case where the decorative part could not be recognized when illumination in the room was darkened but could be recognized by illuminating it with a back light; and it was marked with × in a case where the decorative part did not show similar colors (unison) through a reflected light and a transmitted light.

It can be found from the results shown in Table 1 that the shading decorative sheets of the present invention obtained in the examples are excellent in both of a masking effect and a design as compared with the shading decorative sheets obtained in the comparative examples.

INDUSTRIAL APPLICABILITY

The shading decorative sheet of the present invention has an excellent masking effect, and it is excellent in a design, and it can be used for plate glasses of buildings, partitions for dividing a room and the like.

The invention claimed is:

1. A shading decorative sheet comprising:
   a base layer comprising a thermoplastic resin film having a haze value of 20% or more measured according to JIS K7105, and
   a design layer formed on one surface of the base layer, wherein the design layer comprises a printed part having a similar color to that of the base layer and a non-printed part, wherein
   when the color of the printed part and the color of the base layer are chromatic colors, the color of the printed part and the color of the base layer are a similar color when, in the L*a*b* color system of JIS Z8729, the difference between the ab hue angle of the color of the printed part and the ab hue angle of the color of the base layer is 30 degrees or less, the ab hue angle (h) being calculated as $h = \tan^{-1}(b*/a*)$;
   when the color of the printed part and the color of the base layer are achromatic colors, the color of the printed part and the color of the base layer are a similar color.

2. The shading decorative sheet according to claim 1, wherein the color of the printed part is white and the color of the thermoplastic resin film having a haze value of 20% or more is white.

3. The shading decorative sheet according to claim 1, wherein the design layer is formed by an electrophotographic printing method, an ink jet printing method or a thermal transfer printing method.

4. The shading decorative sheet according to claim 1, wherein a substantially transparent protective layer is present on a surface of the design layer at an opposite side of the base layer.

5. The shading decorative sheet according to claim 4, wherein a pressure sensitive adhesive layer is present between the design layer and the base layer.

6. The shading decorative sheet according to claim 5, wherein a pressure sensitive adhesive layer is present on a surface of the protective layer at an opposite side of the design layer.

7. The shading decorative sheet according to claim 6, wherein a release sheet is present on a surface of the pressure sensitive adhesive layer at an opposite side of the protective layer.

8. The shading decorative sheet according to claim 4, wherein a pressure sensitive adhesive layer is present between the design layer and the protective layer.

9. The shading decorative sheet according to claim 8, wherein a pressure sensitive adhesive layer is present on a surface of the base layer at an opposite side of the design layer.

10. The shading decorative sheet according to claim 9, wherein a release sheet is present on a surface of the pressure sensitive adhesive layer at an opposite side of the base layer.

11. The shading decorative sheet according to claim 8, wherein a pressure sensitive adhesive layer is present on a surface of the protective layer at an opposite side of the design layer.

12. The shading decorative sheet according to claim 11, wherein a release sheet is present on a surface of the pressure sensitive adhesive layer at an opposite side of the protective layer.

13. The shading decorative sheet according to claim 4, wherein the substantially transparent protective layer has a haze value of 20% or less.

14. The shading decorative sheet according to claim 1, wherein a pressure sensitive adhesive layer is present on a surface of the base layer at an opposite side of the design layer.

15. The shading decorative sheet according to claim 14, wherein a release sheet is present on a surface of the pressure sensitive adhesive layer at an opposite side of the base layer.

16. The shading decorative sheet according to claim 1, wherein an achromatic color has an ab chroma value of 12 or less, the ab chroma (c*) being calculated as $c* = \sqrt{(a*^2 + b*^2)}$.

17. A shading decorative sheet comprising:
a base layer comprising a thermoplastic resin film having a haze value of 20% or more measured according to JIS K7105, and
a design layer formed on one surface of the base layer, wherein the design layer comprises a printed part having a similar color to that of the base layer and a lightly printed part, wherein
when the color of the printed part and the color of the base layer are chromatic colors, the color of the printed part and the color of the base layer are a similar color when, in the L*a*b* color system of JIS Z8729, the difference between the ab hue angle of the color of the printed part and the ab hue angle of the color of the base layer is 30 degrees or less, the ab hue angle (h) being calculated as $h = \tan^{-1}(b^*/a^*)$;
when the color of the printed part and the color of the base layer are achromatic colors, the color of the printed part and the color of the base layer are a similar color.

* * * * *